United States Patent
Yagawa (10) Patent No.: US 7,143,112 B2
(45) Date of Patent: Nov. 28, 2006

(54) METHOD AND APPARATUS FOR DATA INTEGRATION

(75) Inventor: Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 491 days.

(21) Appl. No.: 10/660,278

(22) Filed: Sep. 10, 2003

(65) Prior Publication Data

US 2005/0055328 A1    Mar. 10, 2005

(51) Int. Cl.
G06F 17/00 (2006.01)
(52) U.S. Cl. .................... 707/104.1; 707/204
(58) Field of Classification Search ............. 707/1, 707/10, 104.1, 200; 705/1
See application file for complete search history.

(56) References Cited

U.S. PATENT DOCUMENTS 5,884,310 A   3/1999  Brichta et al. ............. 707/10
6,643,635 B1  11/2003 Nwabueze .................. 707/2
6,950,871 B1* 9/2005  Honma et al. ............ 709/226
6,959,306 B1  10/2005 Nwabueze ............... 707/104.1
2002/0116213 A1  8/2002 Kavounis et al. ............. 705/1
2003/0200275 A1* 10/2003 Hirabayashi et al. ....... 709/214

FOREIGN PATENT DOCUMENTS

WO    WO 01/98906 A2   12/2001
WO    WO 02/35359 A2    5/2002

OTHER PUBLICATIONS

Oracle9i Data Warehousing Guide, Oracle, Copyright 1996-2002.*

* cited by examiner

Primary Examiner—Apu Mofiz
(74) Attorney, Agent, or Firm—Townsend and Townsend and Crew LLP (57) ABSTRACT

Aspects of the present invention provide integration of geographically distributed data. The data can be integrated in a single database. An illustrative embodiment of the invention comprises a tight combination between conventional ETL (extraction, translation, and loading) tools and conventional remote copy functionality used for data backup and recovery.

14 Claims, 9 Drawing Sheets

METHOD AND APPARATUS FOR DATA INTEGRATION

BACKGROUND OF THE INVENTION

The present invention relates generally to data management systems and in particular to ETL (extract, transform, load) tools for managing multiple data sources.

Running a successful business requires answers to questions such as how well the business is functioning compared to others, where are the trouble spots in the organization, where can costs be reduced, how are various components of the business performing relative to each other, and so on. The answers to these questions (and others) may lie buried within the data collected by the organization. Techniques for answering such questions typically include culling together the data and producing various reports to provide useful summaries and to reveal trends. Statistical tools and other analytical techniques can be applied to the data to give meaning to what might otherwise appear to be unrelated information. An important aspect of data management is data mining. This is a sophisticated technique which uses intelligent software such as expert systems to detect patterns in the data that other techniques may not detect.

In any large enterprise, however, data is likely to be accumulated in all areas of the enterprise and usually in many incompatible formats. To effectively analyze the data, it is important that there be some degree of uniformity in the data. A good data warehouse or data mart with "clean" data is likely to produce much better results than "raw" data copied from various sources.

A solution usually employed is to extract the data from its various sources, transform it into a consistent format, and then load it into a single database. The database is commonly referred to as a data warehouse or a data mart. Many systems exist that provide this service. SAS and Informatica are two examples that can handle very large amounts of data.

The software tools for doing this are called ETL (extract, transform, load) tools. An ETL tool basically pulls the data from various sources, manipulates it, and prepares it for loading into a data warehouse. The extraction process accesses data through a process of record selection from one or more source databases. The extraction process writes the records to an operational data store for further processing. Once the data is "extracted," it is "transformed" during a transformation process. Some transformation processes include: filtering, where only certain records are kept based on some criteria, e.g., records with certain data values or ranges; summarizing, where two or more records might be combined into a summary record; merging, where two or more "source" records might be merged into a "target" output record; transposing, where information in a record might be converted from one form to another; derivations, data in a record may be combined by mathematical computations to produce a different set of data. Typically, the transformation includes a "cleansing" operation on the transformed data. This process ensures that the data is consistent, of a known recognized value, and otherwise is consistent with a desired data model. The final process in an ETL tool is the loading of the transformed data into the data warehouse or data mart.

The popularization of the Internet has spurred the globalization of businesses. As the infrastructure of the internet continues to develop it becomes easier and more convenient to distribute parts of an enterprise anywhere in the world and to connect the components of the enterprise via the internet. However, movement of large amounts of data over a network can be slow due to heavy network traffic. Data transfers in a local area network (LAN) can be slow since the LAN is used by everyone in the local area. Similarly, wide area networks (WAN) can exhibit slowness, again due to heavy usage, but also because of the switching that is needed to route the data to its destination. This can adversely affect the efficiency of ETL tools, since typically large amounts of data must be gathered from many sources. The problem is amplified if these large amounts of data have to be moved from locations all over the globe.

Given the importance of data warehousing that ETL tools provide, there is a need to improve the performance of ETL tools in today's increasingly distributed data environment.

SUMMARY OF THE INVENTION

Aspects of the present invention provide for integration of data from among many remote data sites. A data extraction routine is produced at each remote site to perform an initial step of extracting data from a source database at the remote. The data that is produced is stored in a data storage facility at the remote. A backup operation is then performed, to migrate the data that is produced from the remote to a collection site. Similar processing occurs at each of the remote sites.

The collection site receives the data from the remote sites as mirrored data. Subsequent processing of the mirrored data is then performed to integrate the data received from the remotes into a collection. In an embodiment of an aspect of the invention, the collection can be a single database.

In an embodiment of another aspect of the invention, the subsequent processing includes a transformation operation followed by a loading operation. In an embodiment of still another aspect of the invention, the transformation operation can be performed at the remote.

BRIEF DESCRIPTION OF THE DRAWINGS

The present invention can be appreciated by the description which follows in conjunction with the following figures, wherein.

DESCRIPTION OF THE SPECIFIC EMBODIMENTS

Figure 1:
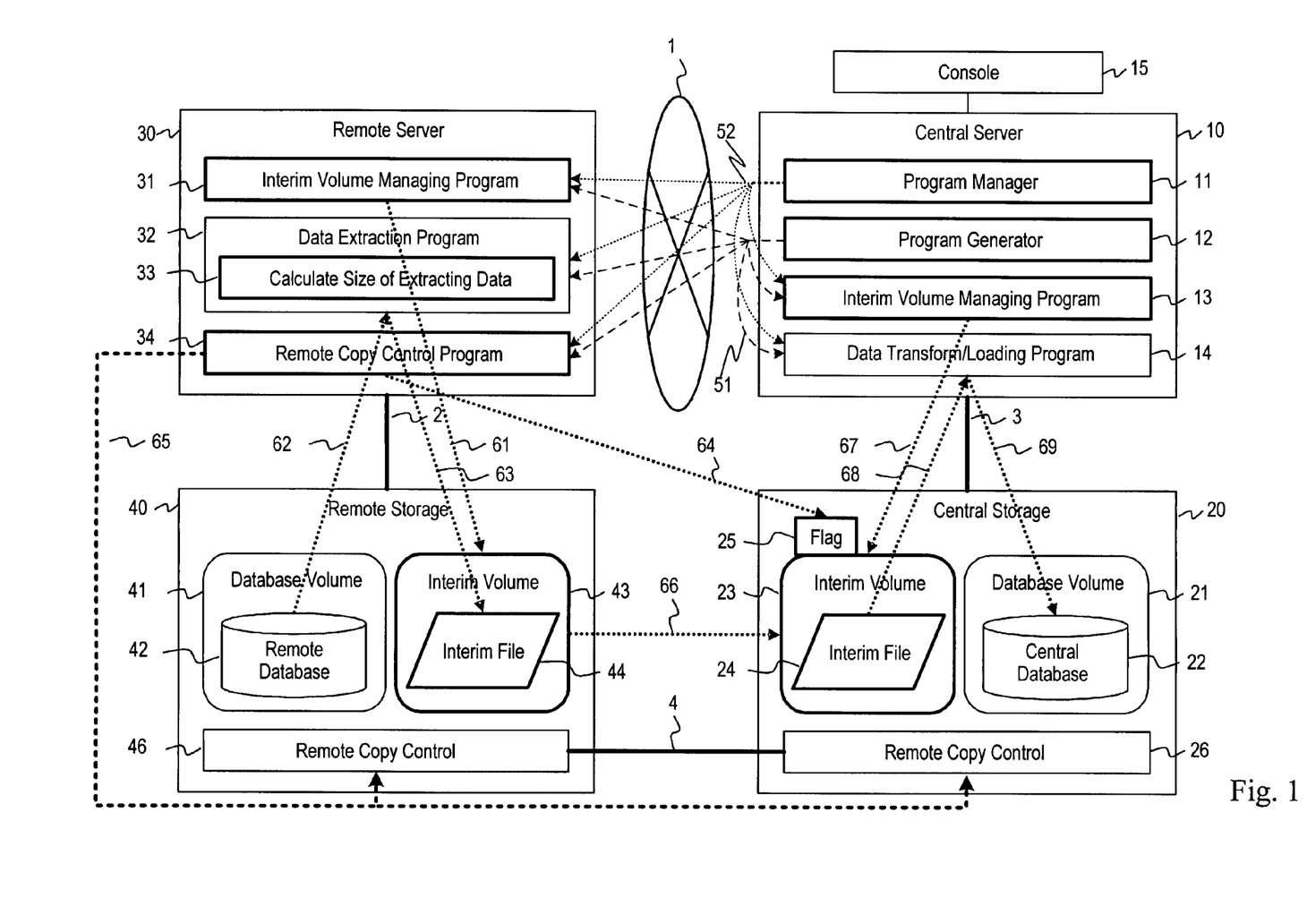
FIG. 1 is a generalized system diagram of an illustrative embodiment of the present invention.

The present invention provides data integration of data from multiple, and typically, distant sources. In a particular embodiment of the invention, a system for data warehousing is disclosed. However, it can be appreciated that the invention can be embodied in any data integration system and is not limited to data warehousing in particular. FIG. 1 shows a system-level generalized block diagram of an illustrative embodiment of the invention. A central server 10 represents a location where data warehousing can be performed. The central server provides various functions according to the invention FIG. 1 illustrates the central server 10 as a single "box." However, this representation should not imply any restrictions as to implementation. The central server can be partitioned into multiple functional units as deemed suitable for a given implementation. For example, networked architectures might partition constituent components throughout the network. Similarly, the functionality of the central server can be partitioned, and the functions might be distributed throughout the network.

A console 15 can serve as a user interface to the access the functionality provided by the central server. Typically, the console provides a graphical user interface (GUI) to facilitate the user's access to the functions provided by the central server 10. Typically, the user is a conventional human user. However, it can be appreciated that the console can be a suitably configured machine interface to allow a machine "user" to access the central server functions. For the sake of discussion, however and without loss of generality, a human user will be assumed, and a suitable GUI will be described.

A central storage facility 20 local to the central server 10 provides data storage for the central server. The central storage facility can be any suitable data storage configuration. A typical enterprise will have large storage requirements. The central storage in that case can be a storage network architecture. A data link 3 provides data communication between the central server and the central storage facility. Typical high-speed links include fibre-channel, FICON (fiber connectivity), ESCON (enterprise system connection), and the like.

A plurality of remote servers represent distant data sources where data is accumulated and stored. Data from among the remote servers at some point in time will be collected and warehoused at the central server 10. FIG. 1 shows a typical embodiment of a remote server 30, embodying aspects of the present invention. It can be appreciated, however, that many remote server implementations are possible in terms of data capacity, data processing, distance, data transmission capability, and so on.

A remote storage facility 40 local to the remote server 30 provides data storage for the remote server. Typically, the remote server cannot access the central storage facility 20 as its primary data store. The remote server may be quite distant from the central server (different part of the city, different state, different country, etc.) and so a suitable high-speed data link between the remote server and the central server is either technically limited (in the case of great distances), or is cost prohibitive. The typical solution is to provide a "local" storage facility at the remote server site; hence the remote storage facility 40. A data link 2 provides data communications between the remote server and the remote storage facility, and can be a fibre-channel connection, FICON (fiber connectivity), ESCON (enterprise system connection), or some other suitable communication link.

Communication among the servers can be provided by a suitable communication network 1. A WAN (wide area network) can provide communications among servers that are geographically distributed. Depending on the configuration, a LAN (local area network) might be suitable. It can be appreciated that the communication network 1 is a relatively slow network that is suitable for uses such as hosting a web site, or for transferring email, and for other low data rate uses. Such networks cannot provide sustained high-speed data throughput that is necessary for remote access of a data storage facility.

Figure 2:
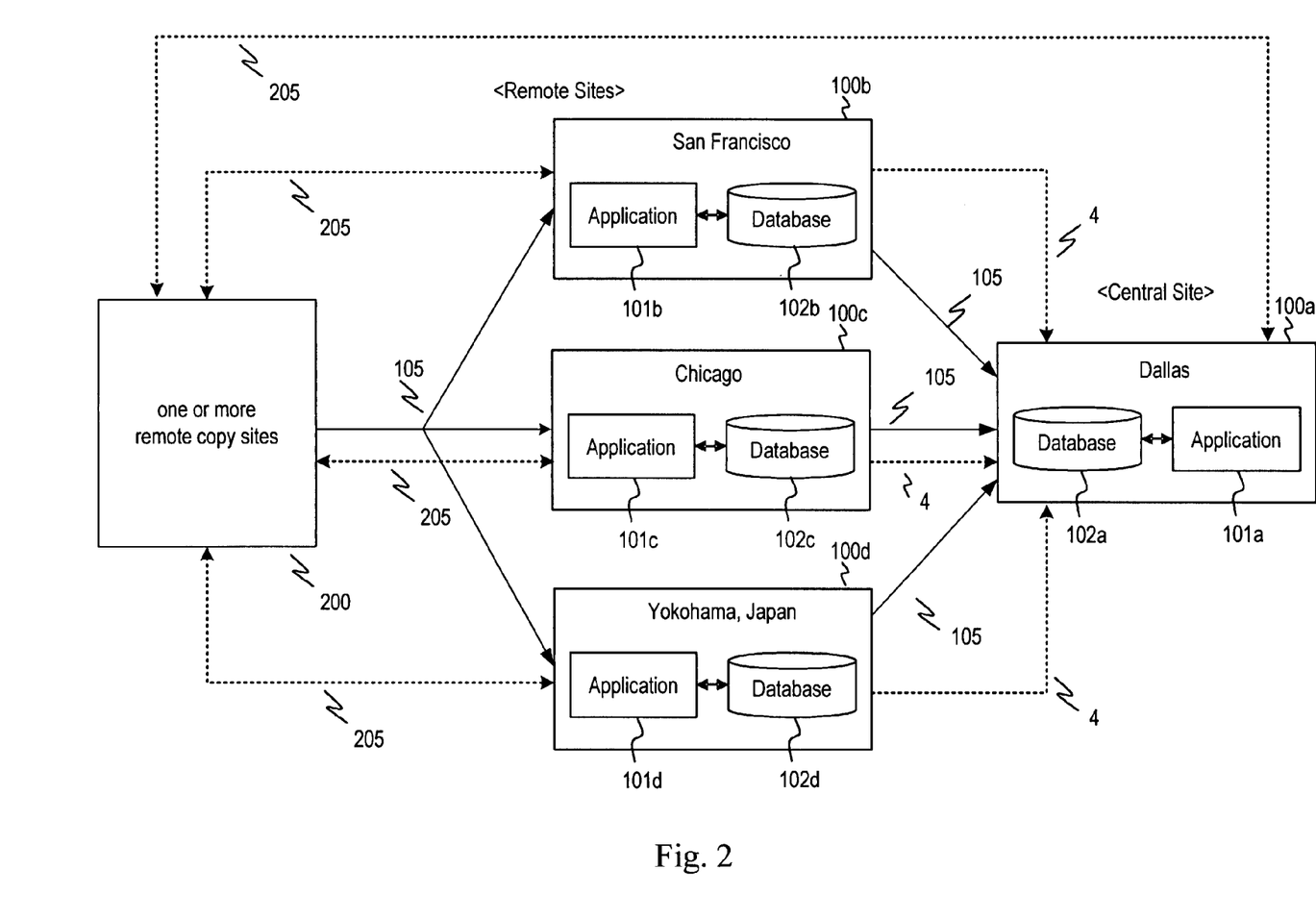
FIG. 2 shows a configuration exemplar of a system according to the present invention.

Turning to FIG. 2 for a moment, a system exemplar shows a geographically distributed configuration of an enterprise that can benefit from the present invention. A central server 100a may be located in Dallas. The server in Dallas site comprises a database 102a and applications 101a which access the database. It can be appreciated that the Dallas site can be configured as a LAN, providing database access over a locally available communication network. The database itself can be distributed. Similarly, the applications 101a can be provided via one or more application servers. Still other configurations known to one of skill in the relevant arts are possible.

The system exemplar of FIG. 2 also includes a plurality of remote sites. The figure shows a remote site in San Francisco 100b, a site in Chicago 100c, and a site in Yokohama, Japan 100d. Each remote site includes a data storage facility 102b–102d that is suitably configured for the data requirements of that site. Similarly, each site can provide applications 101b–101d that differ from site to site. For example, suppose the San Francisco site implements a first database. The Chicago site might implement a second database that is completely different from the San Francisco database. The Yokohama site, might have multiple independent databases, each operating different database applications. It can be appreciated then that the consequence of such diversity can result in vastly different data storage formats, data information formats, database schemas, data access policies, and so on. It can also be appreciated that a widely distributed enterprise makes impractical any idea of providing a centralized data storage facility, especially when the data needs of each of the data sites 100a–100d can be diverse.

Despite such diversity in the data, it is nonetheless often necessary to integrate the data (global data integration) for various reasons. Typical situations can include an enterprise accounting system in which accounting information from the various divisions in the enterprise need to be collected. A CRM (customer relations management) system by which customer information is gathered from many locations and integrated into a usable data set can be an important aspect of the enterprise. As will be described, various aspects of the present invention can facilitate the collection of data from among various data sites as part of the process of integrating data.

FIG. 2 shows that a communication network (WAN, Internet, and so on) 105 interconnects and allows the constituent divisions of the enterprise to communicate among themselves. One or more remote copy sites can be provided for data backup and data recovery purposes. It is noted that the backup site (or data recovery site) is typically combined with the central site in order to avoid having to administer and maintain several data centers. In a given configuration, a single remote copy site might be provided for all of the remote data sites and the central site. In another configuration, a remote copy site might be provided for each data site 100a–100d. Though the figure shows a logical representation of a single remote copy site 200, it can be appreciated that the logical representation can also be representative of an implementation comprising one or more remote copy sites. A remote copy data link 205 for each site 100a–100d provides a data path for remote copy protection of the databases. In accordance with the invention an additional communication channel 4 is provided between the central site 100a and each of the remote data sites 100b–100d. The communication channels 4 will be discussed further, below.

Remote copy in the context of the present invention is to be distinguished from the UNIX network utility "rcp" referred to by the same name. In the present invention, remote copy refers to software and/or hardware architectures for backing up live volumes comprising a data storage facility. Remote copy is known technology in the storage system arts. Remote copy allows "instant" backups of volumes by "freezing" an image of a volume at a particular point in time, and then backing up that frozen image. Remote copy lets users create a duplicate set of production volumes in a non-disruptive manner. For example, a standard production volume may be implemented by a RAID-5 configuration and can be mirrored (duplexed) on remote copy volumes. Data mirroring refers to collecting and storing data redundantly in two or more collections of disks, rather than in just one. Typically, the mirrored volume is distantly located relative to the production volume to protect data against physical harm (e.g., a fire at the production site). Within a storage system, mirroring is a parallel process, not a sequential one.

Returning to FIG. 1, in an illustrative embodiment of the invention, the central storage facility and the remote storage facilities can be provided with remote copy functionality to provide conventional data recovery capability for their respective sites. Such data backup/recovery systems are also referred to as remote mirroring and point-in-time copying. It can be appreciated therefore that the storage facilities can use any of these known data backup systems.

An aspect of the present invention combines database collection tools with data backup techniques to provide an efficient data transfer mechanism. In an illustrative embodiment of this aspect of the invention, a class of data integration tools known as ETL (extraction, transformation, and loading) tools are employed and used in conjunction with suitable remote copy functionality. The system diagram of FIG. 1 shows an implementation according to this embodiment of the invention. The central site (server) component 10 comprises various software components including a program manager 11, a program generator 12, an interim volume managing program 13, and a transform/loading program 14. The remote server site 30 comprises software components including an interim volume managing program 31, a data extraction program 32, and a remote copy control program 34.

Further according an embodiment of this aspect of the invention, a remote copy facility is provided between each remote server site 30 and the central server site 10. For example, Hitachi TrueCopy™ is a remote copy system manufactured and sold by the assignee of the invention which can be used with a suitable storage system. Thus, the system diagram of FIG. 1 shows an implementation wherein the central storage facility 20 comprises a database volume 21 for the central database 22, and an interim volume 23 for storing an interim file 24. A ready indicator function (e.g., flag, semaphore, etc.) 25 can be provided; the purpose of which will be discussed below. In a given particular implementation, the database volume 21 (also referred to as the "production volume") and the interim volume 23 can be provided by any physical storage architecture that is suitable for remote copy operations or other similar backup systems. A remote copy controller 26 such as the TrueCopy™ system can provide the remote copy functionality. Thus, with reference to the particular configuration shown in FIG. 2, the Dallas site 100a can perform standard remote copy-type operations with the remote copy site 200 over the data link 205.

Similarly, at each remote server site 30, its associated remote storage facility 40 comprises database volume 41 (i.e., the "production volume") for storing a remote database 42, and an interim volume 43 for storing an interim file 44. As with the central server storage facility, each remote storage facility 40 can be implemented by any physical storage architecture that is suitable for remote copy operations or other similar backup systems. Similarly, each remote server site can operate a remote copy system 46 to provide backup for data recovery. As mentioned in connection with FIG. 2, each remote server site can perform data backup and recovery operations with the remote copy site 200 via data link 205. It is noted that the remote copy technology can vary from site to site.

In accordance with an embodiment of the invention, an additional data link 4 is provided between each remote server site 30 and the central server site 10. This data link is used to perform remote copy-type operations on the interim volume 43, and can be any data link architecture that is suitable for whatever conventional remote copy technologies are in use. It can be appreciated that it may be convenient to employ the same remote copy system between the central server site and each of the remote server sites. This can be implemented by using the same remote copy technology for data backup/recovery of the production volume (e.g., volume 41) and for performing remote copy operations on the interim volume 43. In an alternative implementation, a first remote copy system can be provided for data backup/recovery of the production volume and a second remote copy technology for the interim volume. The latter approach might be especially suitable in legacy systems where an existing remote copy system may already be installed.

In accordance with an embodiment of the invention, the program generator 12 produces the data extraction routine 32 which executes at each remote site 30. The data extraction routine comprises a size calculation component 33, which will be discussed further in FIG. 7. In addition, the interim volume managing program 31 and remote copy control programs are produced by the program generator. These programs can be produced at the central server 10 and communicated to each remote server 30, as shown by the flow 51 (dashed lines) in FIG. 1. Alternatively, the central server can communicate information that specifies the required functional behavior of the programs (routines) to the remotes so that the remotes can then produce executable routines. For example, source code or some other similar high level representation of the routines can be transmitted to the remotes. The remotes can then compile the source code to produce executable code that is native to the remote.

The program generator 12 also produces an interim volume managing program 13 that executes on the central server site 10. A data transformation program and a data loading program, collectively referenced by reference numeral 14 are also generated and execute on the central server site. The term "executable" routine can refer to machine code, interpreted code, or some other similarly known format. In still another alternative, the program generator 12 can be located at a site other than the central server site 10.

Figure 1A:
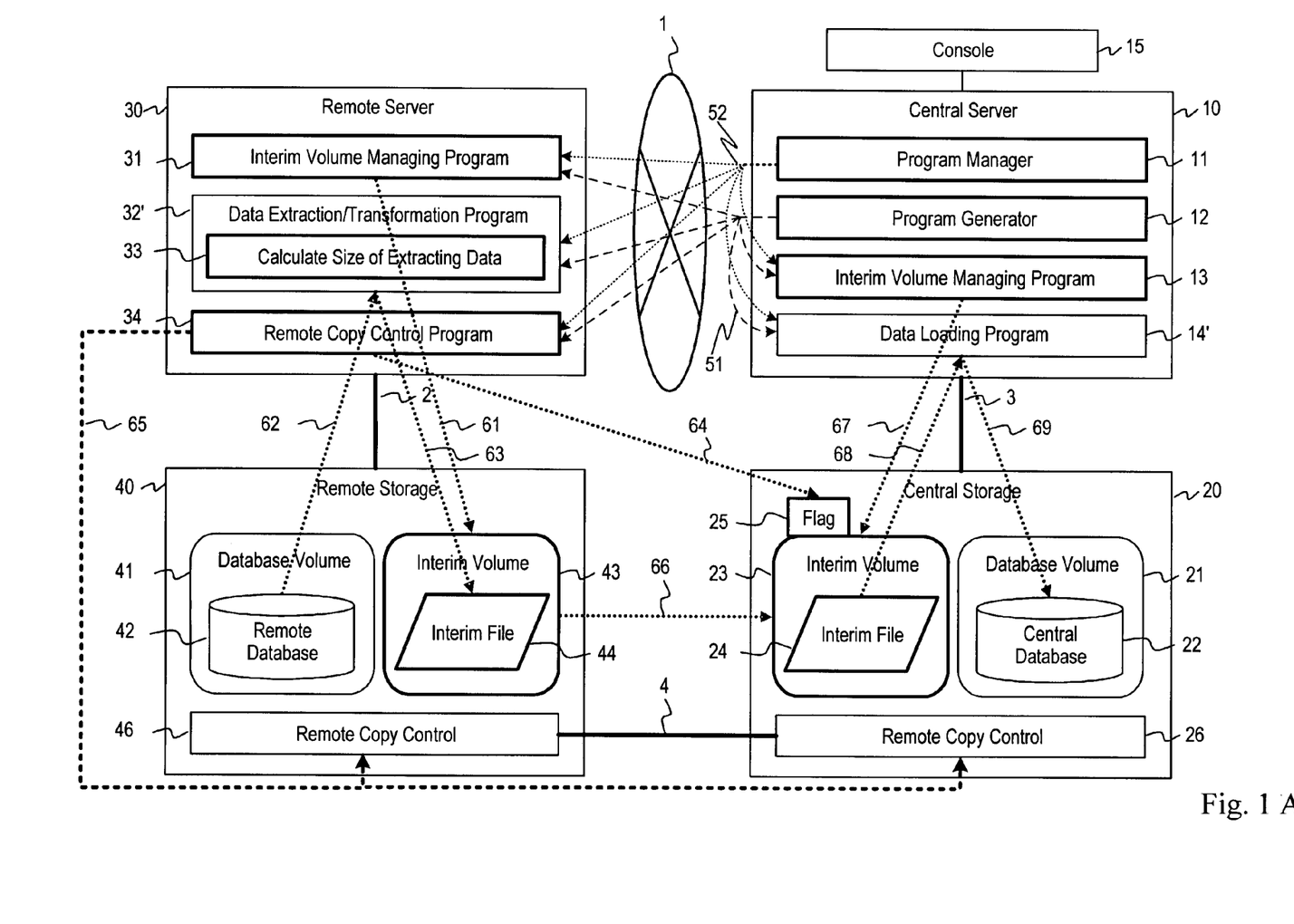
FIG. 1a shows a generalized system diagram of an illustrative embodiment of another aspect of the present invention.

In an alternative implementation, shown in FIG. 1A, the data transformation program can be co-located at the remote site with the data extraction program, collectively referenced by reference numeral 32'. In this implementation, the central server site 10 contains only a data loading routine 14'. In still another implementation (not shown), both the remote server and the central server can be provided with a data transformation program.

As noted above, a particular embodiment of present invention is based on an ETL tool for performing the task of collecting data from the various data sites and coalescing that data into a collection, usually a single database. Conventional ETL tools are known. For example, the tool allows a user to specify an extraction routine, a transformation routine, and a loading routine. In an embodiment of the invention, an ETL tool is provided which can produce extraction, transformation, and loading routines, and a data migration routine.

Figure 3:
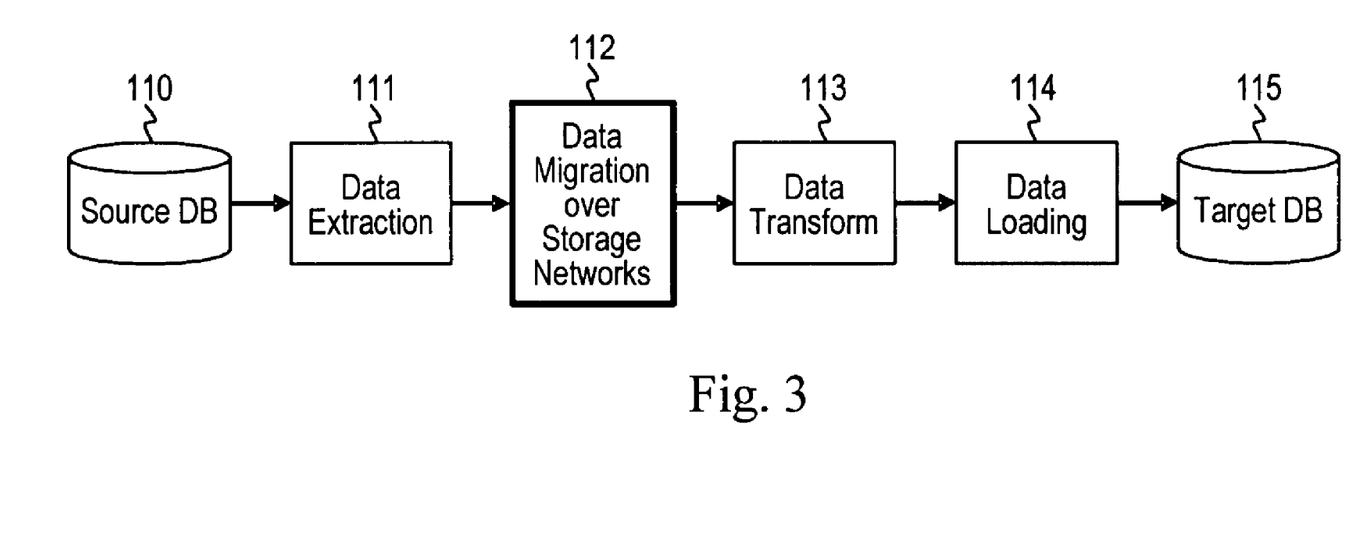
FIG. 3 is a schematic representation of a graphical user interface according to an embodiment of an aspect of the invention.

Typically, a user interacts with an ETL tool via a graphical user interface (GUI). FIG. 3 illustrates a schematic image that might be presented to the user. The basic structure of ETL processing can be presented in a diagram such as the one presented in FIG. 3, showing graphical representations of the various elements comprising the ETL process. One or more data sources can be represented by a graphic 110. Thought the figure shows a single graphic, it can be appreciated that this can represent one or more remote server sites which can act as a source (sources) of data. For example, the data source 110 can represent one of the remote sites 100b–100d shown in FIG. 2. A user might "double-click" on this graphic and in response be presented with a list of the remote sites from which a site can be selected by the user.

A data extraction graphic 111 (e.g., a processing box) represents a data extraction processing portion of the ETL process. The user can double click on this graphic and be presented with an interface that allows a user to specify a data extraction routine 32. Conventional factors that are considered when a user specifies the extraction routine include interfacing to a source DB using ODBC (open database connectivity) access method, JDBC (JAVA database connectivity) access, DBMS native interface, and so on. This information can be used to generate the size computation component 33 of the data extraction routine. In addition, further information must be specified to accommodate the requirements of an extraction routine according to this embodiment of the invention. For example, in an aspect of the present invention, data extraction processing at a remote site may be performed locally and the extracted information might be stored locally with respect to the remote site. Consequently, the extraction routine "executes" on processing hardware at the target (remote) site. Information concerning the target hardware therefore must feed into the process for specifying the extraction routine. This information can be provided by the user, or it can be obtained from a system configuration file that contains information about each remote site. The result is a data extraction routine that is then eventually transmitted to the selected target site.

As indicated above, the routine can be an executable routine, or it can be in the form of a functional specification that can be used by the target to produce an executable routine, or anything between.

A data migration graphic 112 represents the process of moving extracted data (also referred to as extraction data) from the selected remote site 30 to the central site 10. In accordance with an embodiment of an aspect of the invention, the extracted data is stored locally relative the remote site from which the data was extracted. According to a further embodiment of this aspect of the invention, the extraction data produced at the remote site can be backed up by the remote site in a manner similar to the way the remote site would backup its production volumes. Thus, the central server site 10 can serves as the "remote copy site" (i.e., the backup site) for the extracted data, wherein the remote copied data is "backed up" (represented in FIG. 1 by the data path 66) to the interim volume 23 which is locally accessible by the central server site. For the purposes of the following discussion, the term "mirrored data" will represent data received at the central server that was transmitted from a remote site by a remote copy operation, or by some other similar data backup process.

Typically, a remote site 30 will not designate the central server site 10 as the remote copy site for the purposes of backing up its production volumes. Therefore, suitable data migration routines are produced at the central server site and transmitted to the selected remote site 30 to modify the remote copy configuration of the selected remote site in order to ensure that a remote copy operation (i.e., a backup operation) on the extracted data will be sent to the central server. In this particular implementation, an interim volume managing program 31 and a remote copy control program 34 are produced and sent to the remote site. These routines essentially reconfigure the remote copy configuration of the selected remote site so that the extracted data can be "backed up" to the central server site. A user can double click on the data migration graphic 112 and be taken to an interface where the user can specify the parameters of the interim volume managing programs 13 and 31, and the remote copy control program 34. There are two types of interim volume managing: predefined and dynamic. In predefined managing, the program allocates a volume and defines the access to the volume from the server once, at the very beginning of the program executed. In this case, the program re-sizes the volume based on the extracted data size. In dynamic managing, the program allocates and defines the volume every time it is called. In this particular embodiment, dynamic management is explained; however, predefined management can be used instead. Example functions provided by interim volume managing include:

create the volume whose size is specified by element 33
format the volume
define the access path from the server to the volume
mount the volume to the server
un-mount the volume from the server
delete the access path
delete the volume These steps are sometimes referred to as "volume provisioning." Typical functions provided by a remote control copy program 34 are discussed in connection with FIG. 8 below.

A data transform graphic 113 represents a transformation processing portion of the ETL process. Data produced by the data extraction module (data extraction graphic 111) serves as input to the data transform module (graphic 113). The user can double click on this graphic and be presented with an interface that allows a user to specify and program a transformation routine. In the embodiment shown in FIG. 1, the data transformation process occurs at the central server site 10. The data transformation routine 14 can be configured to access the interim volume 23. As will be explained below, the interim volume will be populated with data extracted from the remote sites, and initially stored at the remote sites. A subsequent remote copy operation at the remote server site serves to move the data from the remote site to a volume at a remote copy site, which in the case of the extracted data is the interim volume 23 at the central server site.

In the alternative configuration shown in FIG. 1A, the data transform routine 32' can be located at the remote site. For this situation then, information must be specified to accommodate the requirements of a transformation routine that will execute at a remote site. For example, the transformation routine 32'"executes" on processing hardware at the target remote site. Information concerning the hardware therefore must feed into the process for specifying the transformation routine. This information can be provided by the user, or it can be obtained from a system configuration file that contains information about each remote site. The transformation routine 32 should include processing whereby the transformed data is stored locally relative to the remote site. This can be on a local storage facility or a locally accessed networked storage facility. The result is a transformation routine that is eventually transmitted to the selected remote site. The routine can be an executable routine, or it can be in the form of a functional specification that can be used by the remote to produce an executable routine. In the embodiment of FIG. 1A, the interim volume 23 will be populated with transformed data.

A data loading graphic 114 represents a data loading portion of the ETL process. Data produced by the data transform module (data transform graphic 113) serves as input to the data loading module (graphic 114). The user can double click this graphic and be presented with an interface whereby the data loading parameters can be specified. Typical parameters include information such as the particulars for loading the interim file to the database, like ODBC, JDBC, DBMS native interface and so on. The result is a data loading routine that executes on the central server site. In the embodiment shown in FIG. 1, the data loading routine 14 receives transformed data from the data transformation routine. However, in the embodiment shown in FIG. 1A, the data loading routine 14' is configured to access the interim volume 23 to access the transformed data.

To complete the discussion of FIG. 3, a target DB graphic 115 represents the target database into which extracted and transformed from the various remote sites will be loaded. It can be appreciated that the graphic can represent one or more databases, among the one or more remote sites represented by the graphic 110. The user can double click this graphic and be presented with a list of databases from which to choose. When the user has selected the target database(s), one or more data transform/loading programs 14 can then be produced that are suitable for the selected target database(s).

Thus, a user such as a system administrator, can configure remote sites by selecting one or more remote sites at a time and configuring the extraction routine and data migration routines accordingly for the one or databases contained in those sites. In the embodiment shown in FIG. 1A, a data transformation routine is also configured for the selected remote site. The user then configures a suitable data loading routine and an interim volume managing program for the central site.

Figure 4:
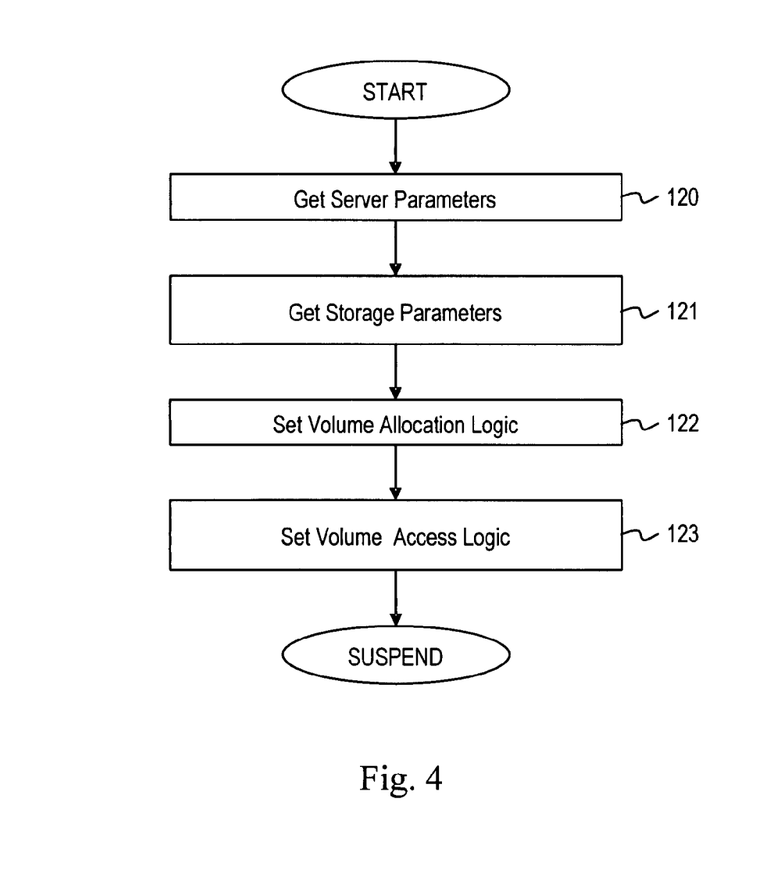
FIG. 4 illustrates generating an interim volume manager program according to an embodiment of an aspect of the present invention.

FIG. 4 is a flow chart highlighting the steps for generating an interim volume managing program 13 that executes on the central server site 10, and an interim volume managing program 31 that executes on a remote server site. The server parameters, either the central server or the selected remote server, are obtained in a step 120. An example of a server parameter is the type of operating system on which the generated executable code will run; e.g., the interim volume managing program 13. Another server parameter defines the volume allocation and access method to the storage. The mount point in the server is yet another parameter that can be specified. Also, if there is other access path information that is necessary, that information can be specified in this step. The directory where the program should be installed might be another parameter. Storage parameters are obtained in a step 121. Examples of storage parameters include storage type, volume type, volume address area to be allocated, and its size. Also, if there is other volume allocation information that is necessary, that information can be provided via this step. If there are several ways to specify volume allocation, then the particular volume allocation method can be specified by the user in a step 122. If there is more than one method for volume access, then the particular access method can be specified by the user in a step 123.

Figure 5:
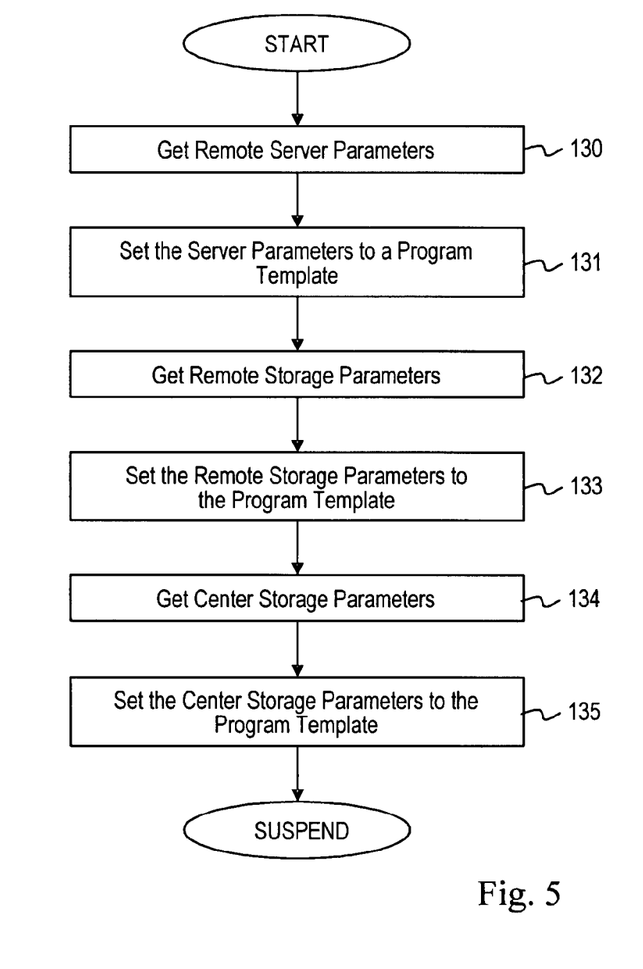
FIG. 5 illustrates generating a remote copy control program according to an embodiment of an aspect of the present invention.

FIG. 5 is a flow chart highlighting the steps for generating a remote copy control program. In a step 130, parameters for the selected remote server site 30 are obtained. An example of a remote server parameter is the type of operating system on which the generated remote copy control program will be executed. Another example is the directory where the program should be installed. These parameters can then be used in a step 131 to define the remote copy program 34. In a step 132, storage parameters for the selected remote site are obtained. An example of storage parameters is the storage serial number or any ID associated with the remote copy to define the pair storage. If the interim volumes are preallocated, then the volume number or ID would be defined as pair volumes. Also, if asynchronous remote copy is used as an implementation, the cache size for buffering data would be another storage parameter. These parameters are used to further define the remote copy control program, in a step 133. Storage parameters for the central server are then obtained in a step 134. These parameters are used to further configure the remote copy control program, in a step 135.

Figure 6:
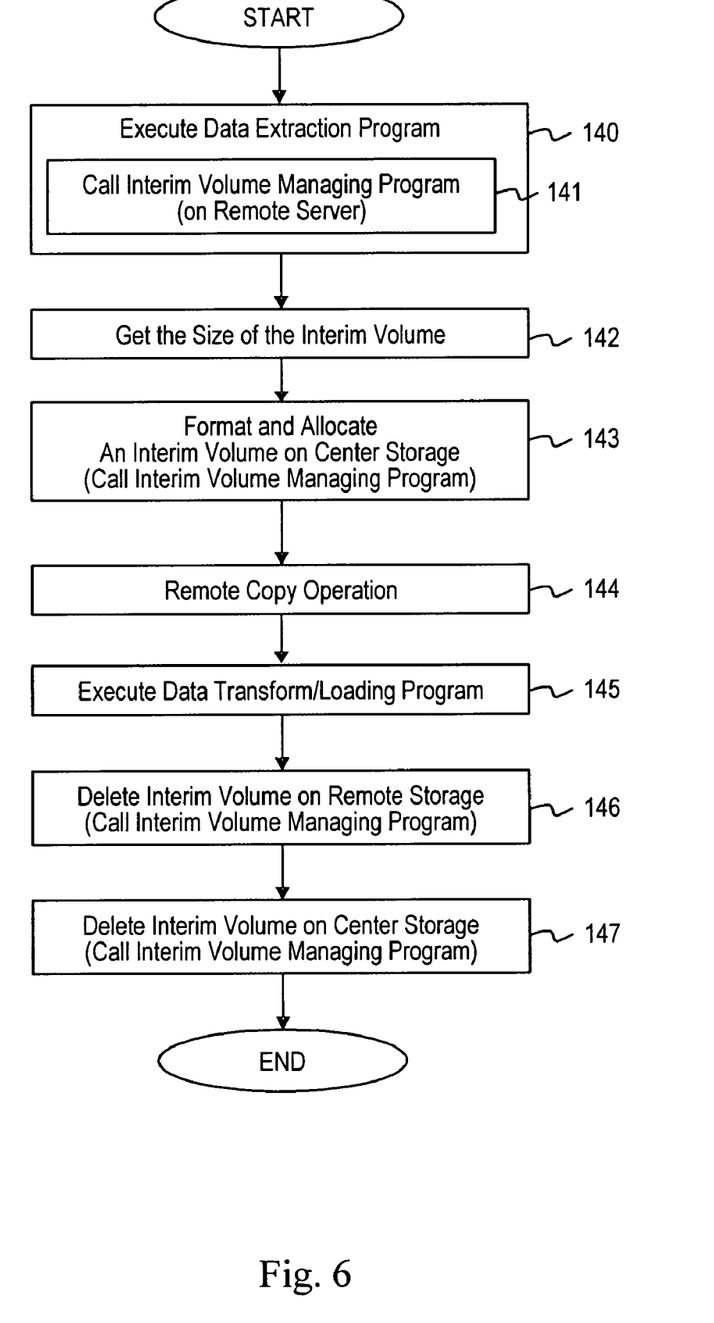
FIG. 6 illustrates processing of a data extraction routine according to an embodiment of an aspect of the present invention.

FIG. 6 is a flow chart highlighting the processing performed by the program manager 11 according to an embodiment of the present invention. In an implementation where the central server site 10 runs under a UNIX-type OS, the program manager may comprise a utility known as "cron" which is used to schedule the running of programs, and various synchronizing mechanisms provided by UNIX and similarly based OS's. For example, the system call "signal( )" can be used to send software signals to processes which may be waiting for an event. Program management can also be provided through the use of a scripting language (shell scripts, perl scripts, etc . . . ) which can initiate the routines to perform the tasks to be discussed below. Data flow can be provided via temporary files. In the case of the UNIX, data can be easily "piped" between processes. It can be appreciated, therefore, that the program manager functionality can be provided in various ways, and may depend on the capabilities of the underlying OS.

Thus, as can be seen in FIG. 6, the data collection process begins by signaling each data extraction routine (step 140). The "signaling" can be a timed event where a remote site will begin data extraction at a particular time. The program manager can transmit a start indicator to the remote site. Data extraction can be initiated in a serial manner, for example, by starting a first remote site, the first remote site then starts a second remote site, the second remote site then starts a third remote site, and so on. As can be seen, the program manager functionality can therefore be distributed among the remote sites, and need not reside wholly at the central site as shown in FIG. 6.

An aspect of the present invention is that the data extraction part of ETL processing occurs locally at the remote data site, and the extracted data is stored locally with respect to the remote site. In accordance with an embodiment of this aspect of the invention, the data extraction routine 32 invokes the interim volume managing program 31 associated with that remote site to store the extracted data (steps 140, 141). When the data extraction is complete, the size of the interim volume 43 used to hold the extracted data is determined (step 142). The size information is communicated (e.g., via the network 1) to the central server 10, whereat the interim volume managing program 13 allocates a logical (interim) volume 23 based on the size information (step 143). This logical volume is used to contain the extracted data that will be received from the remote site and stored in the central server as mirrored data. It is noted here, that the interim volume managing program 13 will receive many such requests, one for each remote site that has extracted data to be sent to the central server. Thus, the amount of space needed on the logical (interim) volume 23 will steadily increase as each remote site reports in with its extracted data size information.

The remote copy control program 34 "waits" to perform a remote copy operation (step 144). A remote copy operation (i.e., backup operation) will cause the interim file 44 which contains the extracted data to be backed up to a remote copy site when the data extraction process has completed. In a particular embodiment, this can be achieved by a synchronization mechanism between the data extraction routine 32 and the remote copy control program 34. This includes providing to the remote copy control program information which identifies the location of the interim volumes and the destination volumes. In an alternative embodiment, the remote copy control program can execute concurrently with the data extraction routine. Thus, the remote copy can take place concurrently as data is being produced during data extraction. The remote copy control program is configured such that the backup operation of the interim file 44 produces an image interim file 24 on the interim volume 23 at the central server site 10. The present invention therefore can use the hardware and software infrastructure for data backup and recovery systems, which are typically high speed connections, to ensure a fast and reliable migration of the extracted data from a remote site to the central server site.

When the central server site 10 receives the extraction data from a remote server 30, transformation and loading routines can be applied to the received extraction data to produce transformed data that is then loaded to the target database (step 145). The data transformation program 14 is configured to obtain the received extraction data from the interim volume 23. Extraction data from each remote data site can be stored in its own interim file 24 as mirrored data. It can be appreciated that other strategies for storing the mirrored data received from the remote sites can be implemented.

When a remote site has migrated its extraction data to the central server site, the interim file 44 at the remote site is deleted (step 146). In addition, the interim volume 43 can be deleted so that the storage space can be re-used. Similarly, when the ETL process has completed the interim file(s) 24 can be deleted (step 147). The interim volume 23 can be deleted also.

Figure 7:
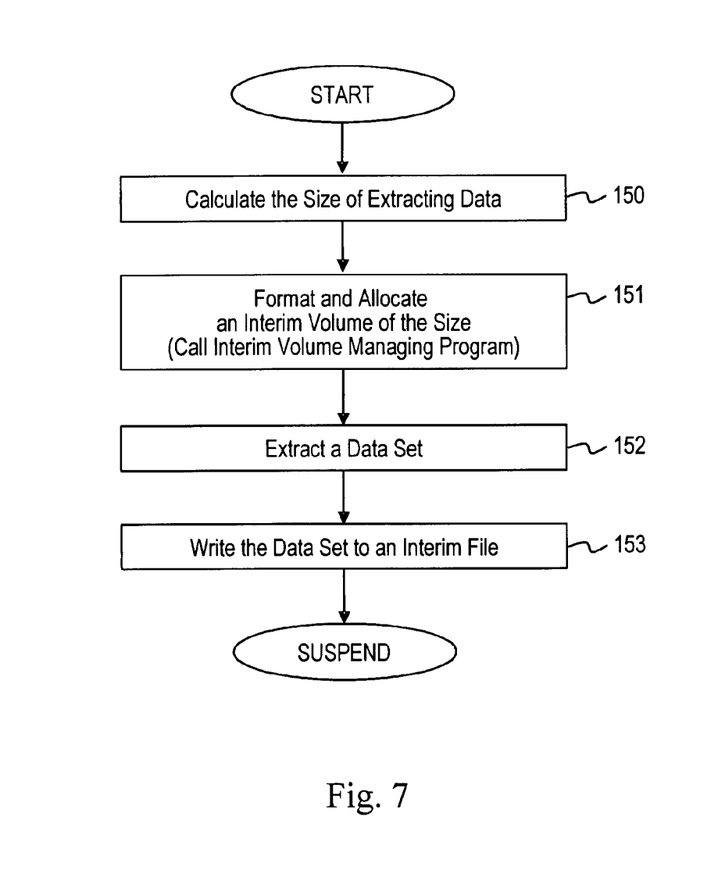
FIG. 7 illustrates processing of a data size calculation routine according to an embodiment of an aspect of the present invention.

FIG. 7 highlights some of the processing steps in an embodiment of the extraction routine 32. The size of the extracted data is determined, in a step 150. While it is generally not practical to compute the exact size of the data to extracted, it is sufficient that a reasonable estimate can be made. Thus, for example, a computation of the estimate can be performed as follows:

first, query the number of record (data) sets that will be extracted from the source database;

second, the maximum size of the record set can be calculated; this would be equal to the size of column in a target table or joined table; and third, the number and the size are multiplied by the number of records and the approximate size is produced.

The interim volume manager program 31 can use the size information to allocate and format (if needed) a logical (interim) volume 43 on which the extracted data will be stored, in a step 151. The database 42 at the remote data site is then processed to produce the extracted data, in a step 152. The extracted data is then written to an interim file 44, in a step 153, during the extraction process.

In an aspect of the invention, processing at the central site is synchronized with operations taking place at the remote sites. In particular, a data transformation and loading operation at the central site cannot take place until extracted data from a remote site is received. FIG. 8 illustrates this aspect of the invention, highlighting some of the processing steps in an embodiment of the remote copy control program 34. Thus, in accordance with an embodiment of this aspect of the invention, a mechanism is provided to achieve this synchronization. In a particular implementation, a ready indicator (flag, semaphore, etc.) 25 is provided in the central server site 10 for each remote site. Thus, each remote site has an associated flag in the central server. In this particular implementation, the states of the flag are READY, DONE, SYNC, and SUSPEND. The flags can be allocated with the interim volume 23, and be set to a default of READY.

Figure 8:
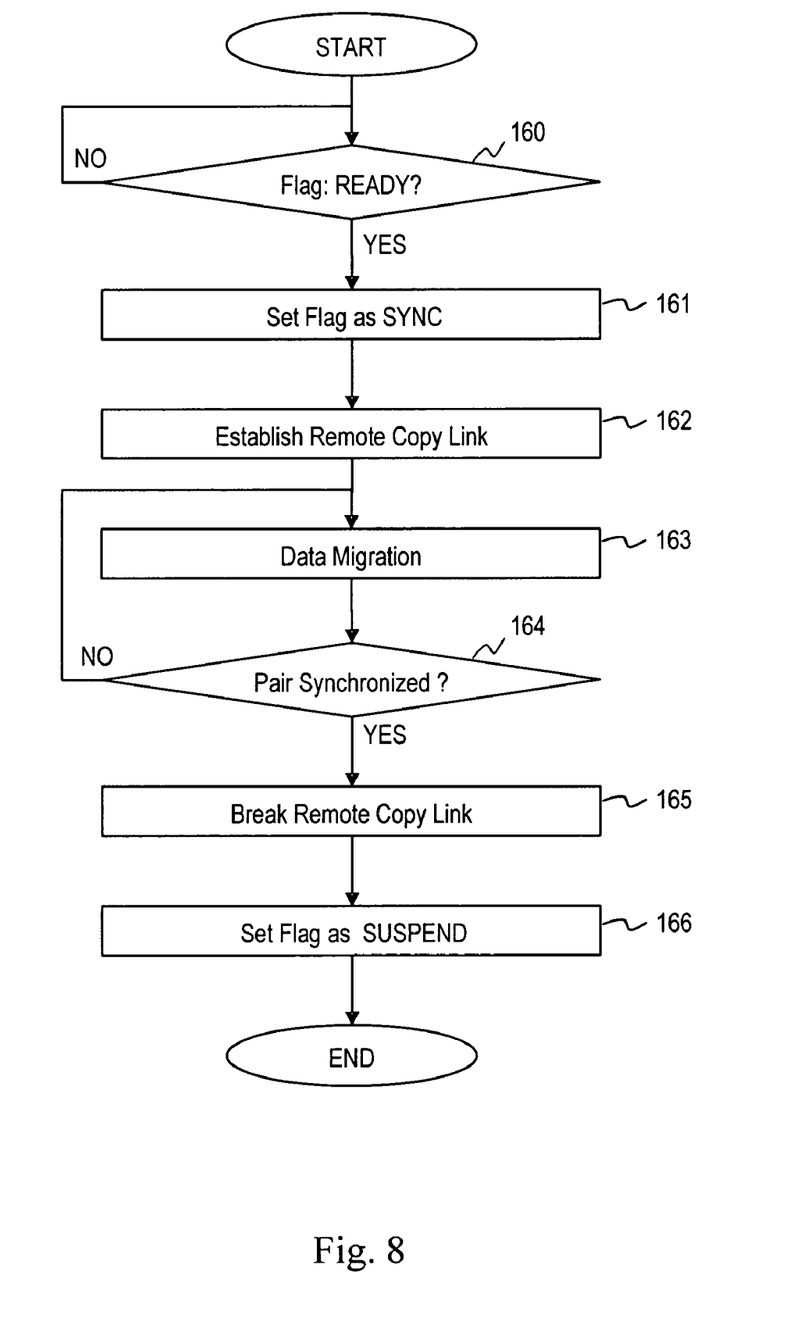
FIG. 8 illustrates processing of a remote copy control program according to an embodiment of an aspect of the present invention.

Continuing with FIG. 8, the remote copy control program 34 "waits" until it can perform a remote copy operation of the interim volume 43 to the central server site 10. This includes waiting for the data extraction process to complete. In another implementation, as noted above, the remote copy control program can begin as soon as the interim volume 43 is ready. In this particular implementation, the flag 25 takes on a READY state or a DONE state. This is explained in connection with FIG. 9. When the "YES" branch is taken from step 160, the remote site communicates a signal to set the flag 25 to SYNC (step 161), indicating to the central server site 10 that the extracted data for the corresponding site has not yet been received and that the remote copy operation is being executed. A remote copy link between the remote site and the central server site is established (step 162). A remote copy operation is then performed in a data migration step 163, backing up the interim volume 43 and hence the interim file 44 to the central server site. A check is made, in a step 164, to determine if the interim volume pair (volume 23 and volume 43) are synchronized (i.e., backed up, mirrored, etc.), and that the data extraction process has completed. If not, then the NO branch is taken and basically a wait loop is performed until the data migration completes. Upon completion, the YES branch is taken.

The remote copy link is then taken down (step 165). The remote site then communicates a signal (step 166) to change the flag 25 to a SUSPEND state, indicating the remote copy link is down and to indicate that the interim volume 43 has been mirrored at the central server site.

Figure 9:
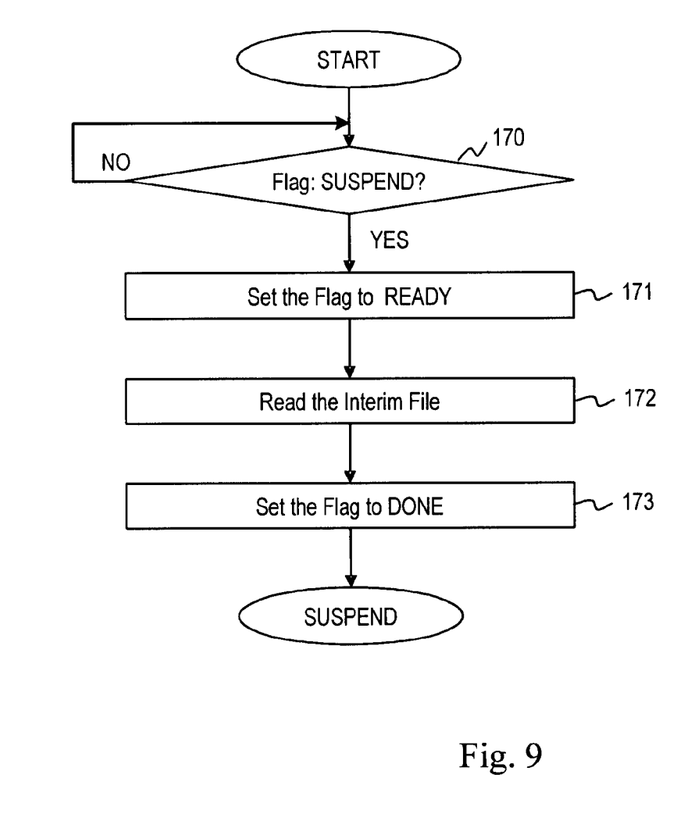
FIG. 9 illustrates processing of a data transformation and a data loading routine according to an embodiment of an aspect of the present invention.

In an aspect of the invention, the data transformation and loading operations are initiated (triggered) when there is an indication of having received extracted data from a remote site. FIG. 9 illustrates an embodiment of this aspect of the invention. In a step 170, the flag 25 corresponding to each remote site is checked. When a flag having a SUSPEND state is detected, the YES branch from step 170 is taken. In a step 171, the flag is set to READY. In a step 172, data contained in the interim file 24 corresponding to the flag having the SUSPEND state will be processed according to the transformation routine. The transformed data produced thereby can then be loaded into the central database according to the load routine. Upon completion of the transformation and loading process, the flag is set to DONE, in a step 173.

Figure 10:
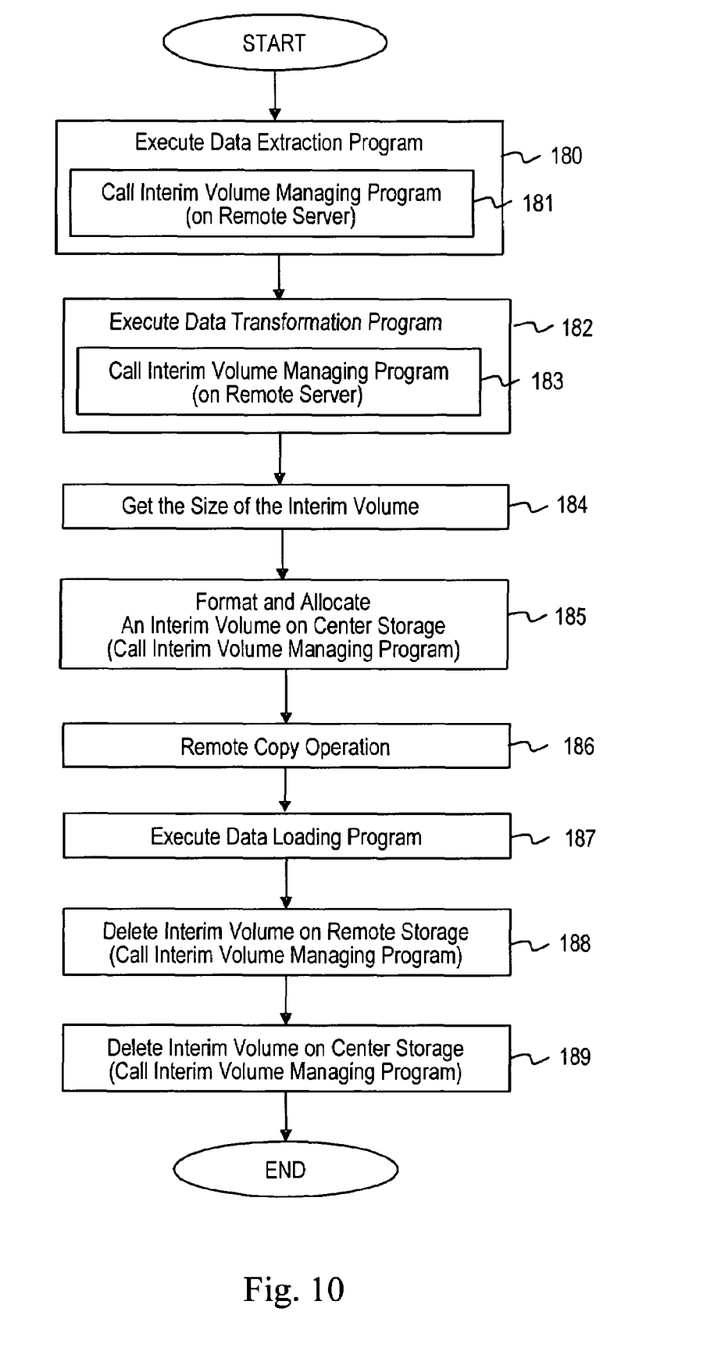
FIG. 10 illustrates processing of a program manager according to an embodiment of another aspect of the present invention.

In another aspect of the invention, the data extraction process and the data transformation process can be performed at the remote data site 30. FIG. 10 shows the processing in accordance with an embodiment of this aspect of the invention. The data collection process begins by signaling each data extraction routine (step 180). As mentioned above, the "signaling" can be a timed event where a remote site will begin data extraction at a particular time. The program manager can transmit a start indicator to the remote site. Data extraction can be initiated in a serial manner, for example, by starting a first remote site, the first remote site then starts a second remote site, the second remote site then starts a third remote site, and so on.

The data extraction routine 32 invokes the interim volume managing program 31 associated with that remote site to store the extracted data (steps 180, 181). As discussed above with respect to FIG. 7, this involves determining the size of the extracted data and allocating/defining an interim volume on which the extracted data will be stored. The data transformation routine processes the extracted data (step 182) to produce transformed data. The interim volume managing program may be invoked (step 183) if the interim volume needs to be re-sized to accommodate the transformed data. It can be appreciated that data extraction and data transformation can occur in parallel in a pipeline manner. Alternatively, the data extraction can run to completion before starting the data transformation processing.

When the data transformation is complete, the size of the interim volume 43 used to hold the transformed data is determined (step 184). The size information is communicated (e.g., via the network 1) to the central server 10 whereat the interim volume managing program 13 in the central server site allocates storage space based on the size information (step 185). This allocated space is used to contain the transformed data that will be received from the remote site. It is noted here, that the interim volume managing program 13 will receive many such requests, one for each remote site that has transformation data to be sent to the central server. Thus, the amount of space needed on the interim volume 23 will therefore steadily increase as each remote site reports in with its extracted data size information.

The remote copy control program 34 "waits" to perform a remote copy operation (step 186). A remote copy operation will cause the interim file 44 which contains the transformed data to be backed up the central server site 10. As noted above in FIG. 6, this can include providing to the remote copy control program information which identifies the location of the interim volumes and the destination volumes. In addition, the remote copy operation can occur concurrently with the data transformation process. Thus, the remote copy can take place concurrently as data is being produced during data transformation.

When all of the remote data sites that have transformation data have uploaded the data to the central server site, then the data is loaded to the target database (step 187). The data loading program 14' (FIG. 1A) is configured to obtain extracted data from the interim volume. Extracted data from each remote data site can be stored in its own interim file 24 on the interim volume 23.

When a remote site has migrated its extracted data to the central server site, the interim file 44 at the remote site is deleted (step 188). In addition, the interim volume 43 can be deleted so that the storage space can be re-used. Similarly, when the ETL process has completed the interim file(s) 24 can be deleted (step 189). The interim volume 23 can be deleted also.

In yet another aspect of the invention, some remote sites can be configured to perform only data extraction, allowing the transformation and loading phases to be performed at the central server site 10. Other remote sites can be configured to perform both the data extraction and the transformation operation at the remote site, allowing the loading phase to be performed at the central server site.

What is claimed is:

1. A computer-implemented method for collecting data from among a plurality of data sites to be stored at a central site, each data site having an associated data store, the method comprising:

providing each data site with a corresponding extraction routine;

for each data site, processing data contained in its associated data store in accordance with its corresponding extraction routine to produce first data, the corresponding extraction routine configured to store the first data in a storage location at the data site if the processing produces first data;

collecting second data which is based on first data obtained from those data sites for which their corresponding extraction routines produced said first data; and loading all of the second data into a database, wherein the step of collecting includes communicating the first data to a central site in accordance with a remote copy operation, receiving at the central site the first data as mirrored data, and transforming the mirrored data to produce the second data, the second data being stored at the central site, wherein the step of providing a corresponding extraction routine comprises, for each data site:

receiving a specification information which is descriptive of data stored in a data store associated with the data site;

producing the extraction routine based on the specification information; and communicating the extraction routine to the data site.

2. The method of claim 1 wherein the step of collecting comprises, at each data site that has first data, performing a data backup procedure on the first data, wherein the central site is viewed as a backup site.

3. The method of claim 1 wherein the step of communicating the first data includes signaling the central site at time when the remote copy operation is complete, the step of transforming the mirrored data being initiated in response to the central site being signaled.

4. The method of claim 1 wherein the step of collecting includes: transforming the first data to produce the second data, the second data being stored at the data site; communicating the second data to a central site in accordance with a remote copy operation, and receiving at the central site the second data as mirrored data.

5. The method of claim 1 further comprising providing each data site with a corresponding remote copy program.

6. The method of claim 1 further including providing each data site with a corresponding transformation routine, and for each data site having first data processing the first data by executing its corresponding transformation routine to produce the second data.

7. A data collection system comprising a plurality of remote data sites and a data collection site, the remote data sites and the data collection site configured to operate according to the method of claim 1.

8. A computer-implemented method for collecting data from among a plurality of data sites to be stored at a central site, each data site having an associated data store, the method comprising:
   providing each data site with a corresponding extraction routine;
   for each data site, processing data contained in its associated data store in accordance with its corresponding extraction routine to produce first data, the corresponding extraction routine configured to store the first data in a storage location at the data site if the processing produces first data;
   collecting second data which is based on first data obtained from those data sites for which their corresponding extraction routines produced said first data, the second data being based on the first data; and
   loading all of the second data into a database,
   wherein the step of collecting includes communicating the first data to a central site in accordance with a remote copy operation, receiving at the central site the first data as mirrored data, and transforming the mirrored data to produce the second data, the second data being stored at the central site,
   wherein the step of providing a corresponding extraction routine comprises, for each data site:
     receiving a first specification information which is descriptive of data stored in its associated data store;
     producing a second specification information based on the first specification information which is descriptive of the extraction routine;
     communicating the second specification information to the data site; and producing, at the data site, the extraction routine based on the second specification information.

9. The method of claim 8 wherein the second specification information is source code.

10. A data collection system comprising:
   a central data site comprising at least one host processor;
   a host storage system operatively coupled to the at least one host processor;
   at least one remote data site comprising at least one remote processor; and
   a remote storage system operatively coupled to the at least one remote processor,
   the at least one host processor having program generating code configured to:
     obtain storage related parameters from the at least one remote data site;
     generate first interim volume managing code;
     generate second interim volume managing code;
     generate a data extraction routine, including receiving a specification information based on the storage related parameters and producing the extraction routine based on the specification information;
     generate remote copy control code based on the storage related parameters; and
     transfer the second interim volume managing code, the data extraction routine, and the remote copy control code to the at least one remote data site,
   the at least one host processor further having program manager code configured to initiate processing of the second interim volume managing code, the data extraction routine, and the remote copy control code,
   the data extraction routine configured to produce extracted data,
   the remote copy control code configured to perform a data duplication operation of the extracted data, wherein the central data site serves as the duplication site for the extracted data,
   the first interim volume managing code configured to allocate a host interim volume in the host storage system for storing at least some of the extracted data,
   the second interim volume managing code configured to allocate a remote interim volume in the remote storage system for storing the extracted data.

11. The system of claim 10 wherein the data duplication operation is a remote copy operation.

12. The system of claim 10 wherein the at least some of the extracted data is copied to the central data site as the result of a data mirroring operation.

13. The system of claim 10 wherein data extraction routine includes a size calculation component to produce a data size metric indicative of the size of the extracted data, the data size metric being communicated to the first interim volume managing code and to the second interim volume managing code, wherein the host interim volume is allocated based at least on the data size metric and the remote interim volume is allocated based at least on the data size metric.

14. The system of claim 13 wherein the host interim volume has a flag associated with the remote data site, the remote copy control code further configured to set the flag to a first value when performing the backup operation and to set the flag to a second value when the backup operation has completed.

* * * * *